US005289147A

United States Patent [19]

Koike et al.

[11] Patent Number: 5,289,147

[45] Date of Patent: Feb. 22, 1994

[54] IMAGE FORMING APPARATUS HAVING SYSTEM FOR REDUCING NOISE

[75] Inventors: Tadao Koike, Tokyo; Kenji Fukumizu, Yokohama; Hiroo Kitagawa, Yokohama; Fumihiko Ishikawa, Yokohama; Tkaaki Yanagisawa, Tokyo; Satoshi Kanda, Yokohama, all of Japan

[73] Assignee: Ricoh Company, Ltd., Tokyo, Japan

[21] Appl. No.: 878,691

[22] Filed: May 5, 1992

[30] Foreign Application Priority Data

| | | | |
|---|---|---|---|
| May 15, 1991 | [JP] | Japan | 3-110566 |
| Jun. 14, 1991 | [JP] | Japan | 3-143450 |
| Jan. 9, 1992 | [JP] | Japan | 4-002081 |

[51] Int. Cl.[5] ..................... G03G 21/00; G01K 11/16; H04N 1/00; B41J 29/10

[52] U.S. Cl. .................................... 355/200; 181/206; 381/71

[58] Field of Search ........................ 355/202, 207, 200; 381/71; 181/206

[56] References Cited

U.S. PATENT DOCUMENTS 5,029,218 7/1991 Nagayasu ............................. 381/71

FOREIGN PATENT DOCUMENTS 61-127377 6/1986 Japan .
61-262166 11/1986 Japan .
3-144663 6/1991 Japan ................................... 355/207

OTHER PUBLICATIONS

Hareo Hamada et al, "Active Noise Control Chair," *The Institute of Electronics, Information and Communication Engineers*, Apr. 26, 1990, pp. 7-14.

*Primary Examiner*—Joan H. Pendegrass
*Attorney, Agent, or Firm*—Mason, Fenwick & Lawrence

[57] ABSTRACT

An image forming apparatus includes a housing, a mechanism, mounted in the housing, for forming images on a medium, an operation panel formed on the housing, the mechanism being driven in accordance with an operating instruction input from the operation panel by an operator, a microphone, provided in the housing, for detecting a noise generated by a driving of the mechanism, and a noise canceling unit for outputting an acoustic wave to an area adjacent to the operation panel of the housing, the acoustic wave being generated based on the noise detected by the microphone so that the acoustic wave and a noise present in the area cancel out, whereby the noise present in the area is reduced.

38 Claims, 17 Drawing Sheets

IMAGE FORMING APPARATUS HAVING SYSTEM FOR REDUCING NOISE

BACKGROUND OF THE INVENTION (1) Field of the invention

The present invention generally relates to an image forming apparatus, such as a copy machine, a facsimile machine or a printer, and more particularly to an image forming apparatus having a system for reducing noise caused by operation of the image forming apparatus in a predetermined space.

(2) Description of related art

In, for example, a copy machine (an image forming apparatus), an image receptor body (a photosensitive member) on which latent images can be formed, a developing unit for developing latent images on the image receptor body, a transfer unit for transferring a visible image obtained by the developing unit from the image receptor body to a transfer material (a recording sheet) and so on are housed in a main body. In addition, the main body of the copy machine can be integrated with peripheral equipments, such as an automatic document feeder unit, a sorter unit, a stapler unit, and the like. Thus, when the image forming apparatus such as the copy machine is being operated, various noises can be generated therefrom.

In the main body of the copy machine, there are vibrations caused by a rotation of a main motor for driving various mechanisms therein, noises generated when papers are fed by rollers, noises generated when developer is agitated in the developing unit, and the like. In a sorter unit, there are noises generated when feed rollers are rotated and noises generated when papers are set in bins in the sorter unit. In a stapler unit, there are noises generated when papers are stapled. The above noises generated in the main body of the copy machine and the peripheral equipments integrated with the main body are radiated from them via openings used for heat radiation and for ejecting papers.

Conventionally, a sound arrestor of an impact printer has been disclosed in Japanese Patent Laid Open No. 61-262166. In the sound arrestor disclosed in the reference, a noise generated by a printer head is canceled by an acoustic wave having a phase inverse to the noise.

In addition, the applicant has been proposed an apparatus in which the noise generated in a machine is canceled by an acoustic wave having a phase inverse to that of the noise, in U.S. patent application Ser. Nos. 810,169 and 851,375.

However, a position at which a loudspeaker outputting an acoustic wave for canceling the noise generated by a machine is mounted is not related to an area in which an operator is positioned when operating the machine. Thus, the noise generated in the machine is not always effectively reduced for the operator of the machine.

Further, in an image forming apparatus, such as a copy machine, an area in which the operator may be positioned varies in accordance with operation mode. For example, an area in which the operator may be positioned in a normal copy mode differ from that in which the operator may be positioned in an operation mode using the sorter unit.

An image forming apparatus, such as a copy machine, is set up in an office. In this case, it is desirable that noises caused by the copy machine be effectively reduced in an area, in which persons work, remote from the copy machine.

SUMMARY OF THE INVENTION

Accordingly, a general object of the present invention is to provide a novel and useful image forming apparatus having an antinoise system in which the disadvantages of the aforementioned prior art are eliminated.

A more specific object of the present invention is to provide an image forming apparatus having a function for effectively reducing a noise caused by operations the image forming apparatus in an area in which an operator may be positioned.

The above objects of the present invention are achieved by an image forming apparatus comprising: a housing; a mechanism, mounted in the housing, for forming images on a medium; an operation panel formed on the housing, the mechanism being driven in accordance with an operating instruction input from the operation panel by an operator; noise detecting means, provided in the housing, for detecting a noise generated by a driving of the mechanism; and noise canceling means, coupled to the noise detecting means, for outputting an acoustic wave to an area adjacent to the operation panel of the housing, the acoustic wave being generated based on the noise detected by the detecting means so that the acoustic wave and a noise present in the area cancel out, whereby the noise present in the area is reduced.

According to the present invention, a noise can be reduced in an area adjacent to the operation panel of the housing. That is, the noise can be reduced in an area in which an operator usually is positioned.

Another object of the present invention is to provide an image forming apparatus having a function for effectively reducing an noise caused by operations of the image forming apparatus in various areas in which an operator may be positioned.

The above objects of the present invention are achieved by an image forming apparatus comprising: a housing; a mechanism, mounted in the housing, for forming images on a medium; an operation panel formed on the housing, the mechanism being driven in accordance with an operating instruction input from the operation panel by an operator; noise detecting means, provided in the housing, for detecting a noise generated by a driving of the mechanism; and noise canceling means, coupled to the noise detecting means, for outputting acoustic waves to respective areas, each of the acoustic waves being generated based on the noise detected by the detecting means so that each of the acoustic waves and a noise present in a corresponding one of the areas cancel out, whereby the noise present in each of the areas is reduced.

According to the present invention, noises can be reduced in a plurality of areas. Thus, it is possible to effectively reduce noises in various areas in which an operator may be positioned.

Further another object of the present invention is to provide an image forming apparatus having a function for effectively reducing an noise caused by operations of the image forming apparatus in an area remote from the image forming apparatus.

The above objects of the present invention are achieved by an image forming apparatus comprising: a housing;

a mechanism, mounted in the housing, for forming images on a medium; an operation panel formed on the housing, the mechanism is driven in accordance with an operating instruction input from the operation panel by an operator; noise detecting means, provided in the housing, for detecting a noise generated by driving of the mechanism; and noise canceling means, coupled to the noise detecting means, for outputting an acoustic wave to an area remote from the housing, the acoustic wave being generated based on the noise detected by the detecting means so that the acoustic wave and a noise present in the area cancel out, whereby the noise present in the area is reduced.

According to the present invention, a noise can be reduced in an area remote from the housing of the image forming apparatus.

Additional objects, features and advantages of the present invention will become apparent from the following detailed description when read in conjunction with the accompanying drawings.

DESCRIPTION OF PREFERRED EMBODIMENTS

A description will now be given of a first embodiment of the present invention with reference to FIGS. 1 through 9.

Figure 1:
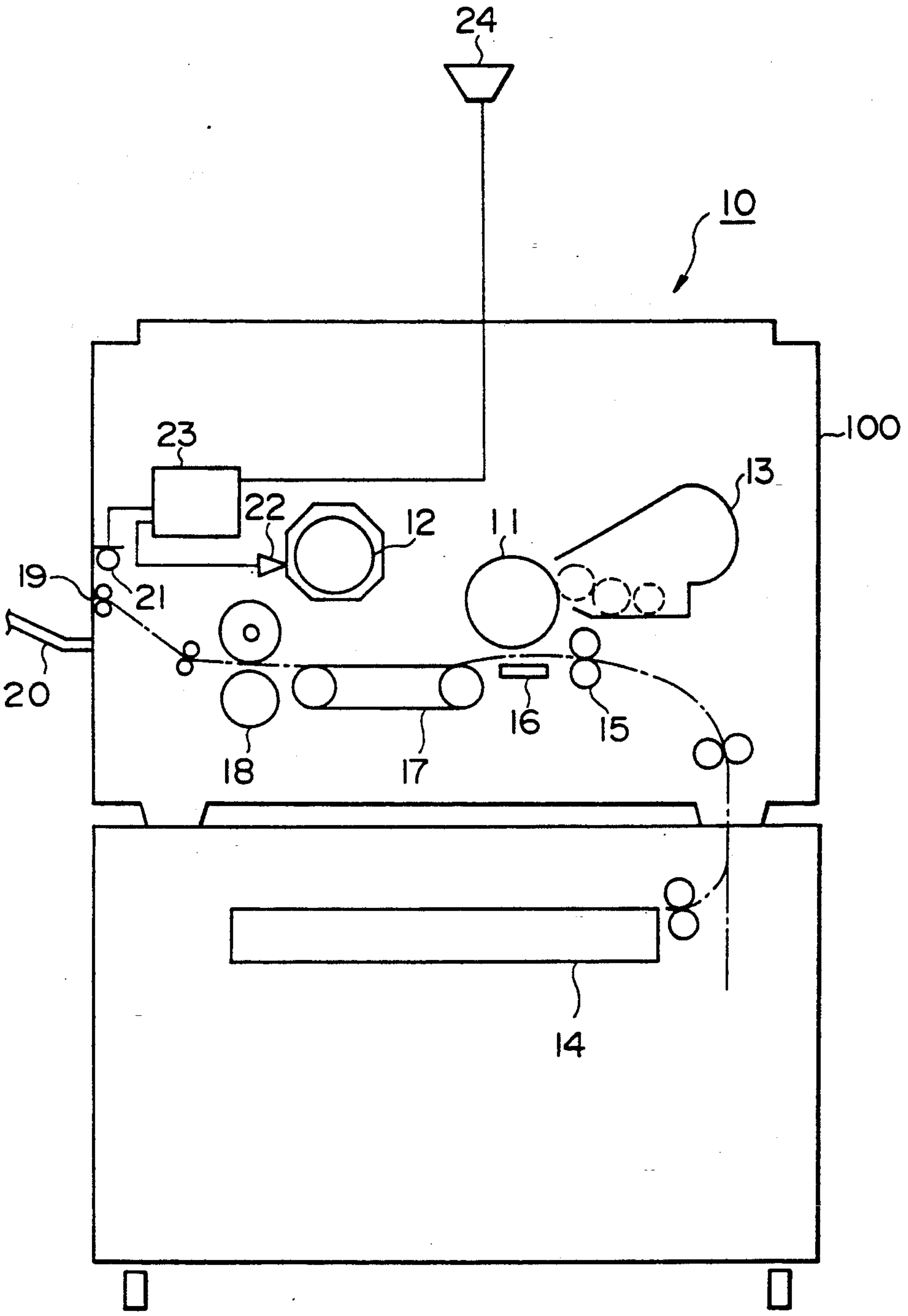
FIG. 1 is a diagram illustrating a copy machine according to a first embodiment of the present invention.

Referring to FIG. 1, which shows a copy machine 10 for forming images in accordance with an electrophotographic process, a photosensitive drum 11 is rotated by a main motor 12 when copying. The surface of the rotated photosensitive drum 11 is uniformly charged by a charging unit, and then is exposed in accordance with image information by a exposure unit so that an electrostatic latent image is formed on the surface of the photosensitive drum 11. The electrostatic latent image is developed by the developing unit 13, so that a visible image corresponding to the electrostatic latent image is formed on the photosensitive drum 11. A recording paper is fed from a paper supplier 14 to a registration rollers 15. The registration rollers 15 feeds the recording paper toward a transfer unit 16 so that the visible image on the photosensitive drum 11 face the recording paper. Then the visible image is transferred from the photosensitive drum 11 to the recording paper by the transfer unit 16, so that the visible image is formed on the recording paper. The recording paper having the visible image is fed, by a paper feeding unit 17, to a fixing unit 18, and the visible image is fixed on the recording paper. The recording paper having the visible image fixed thereon is ejected, as a copied paper, to an ejecting tray 20.

Openings through which papers pass and openings for radiating heat by fans are formed on a housing 100 of the copy machine 10. Thus noises generated in the housing 100 leaks from the housing 100 through the openings. Thus, a microphone 21 for detecting noises is mounted, for example, at a position close to an opening 19 through which papers are ejected to the ejecting tray 20. The microphone 21 outputs a noise source signal corresponding to noises detected thereby. Noises can be also generated caused by vibrations of motors. Thus, for example, a vibration pickup 22 for detecting a vibration of the main motor 12 is mounted in the housing 100. The vibration pickup outputs a noise source signal corresponding to the vibration of the main motor 12. At least either the microphone 21 or the vibration pickup 22 may be mounted in the housing 100.

The noise source signal output from the microphone 21 and/or the vibration pickup 22 is supplied to a signal processing circuit 23. The signal processing circuit 23 processes the noise source signal supplied from the microphone 21 and/or the vibration pickup 22 in accordance with a predetermined procedure so as to output a control sound signal. The control sound signal is supplied from the signal processing circuit 23 to a loudspeaker 24, so that the loudspeaker 24 outputs a control sound corresponding to the control sound signal. A loudspeaker 24 is mounted at a position in an antinoise area in which the noises should be reduced. A detailed description will be given later of a position at which the loudspeaker 24 is mounted.

Figure 2:
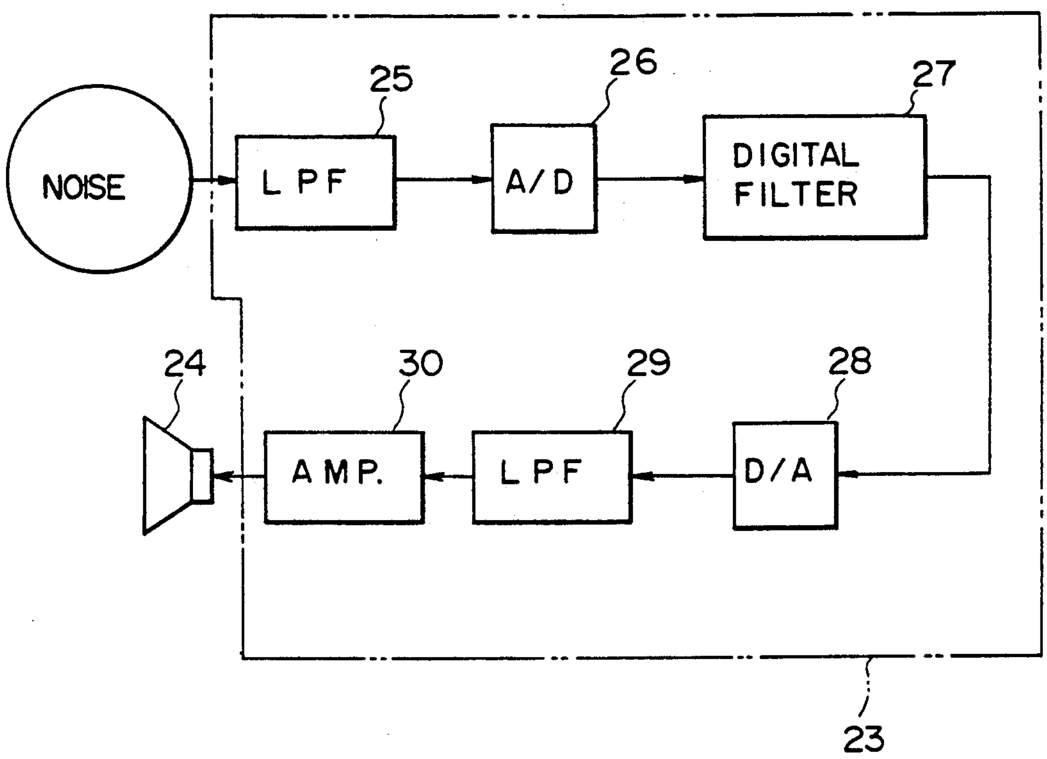
FIG. 2 is a block diagram illustrating a signal processing circuit provided in the copy machine shown in FIG. 1.

The signal processing circuit 23 is formed as shown in FIG. 2.

Referring to FIG. 2, the signal processing circuit 23 has a first low-pass filter (LPF) 25, an analog to digital converter 26, a digital filter 27, a digital to analog converter 28, a second low-pass filter (LPF) 29 and a power amplifier 30. The noise source signal is supplied to the analog to digital converter 26 via the first low-pass filter 26. The noise source signal supplied from the microphone 21 and/or the vibration pickup 22 inputs to the analog to digital converter 26 via the low-pass filter 25. The digital data obtained by the analog to digital converter 26 passes through the digital filter 27. The digital data filtered by the digital filter 27 is converted into analog signal by the digital to analog converter 28 so that the sound control signal is obtained. Then the sound control signal output from the digital to analog converter 28 is supplied to the loudspeaker 24 via the second low-pass filter 29 and the power amplifier 30.

Filter coefficients in the digital filter 27 are determined so that the control sound output from the loudspeaker 24 negatives noises transmitted from noise sources in the housing 100 to an antinoise area in which the loudspeaker 24 is provided. The filter coefficients in the digital filter is controlled by an adaptive signal-processing circuit in an antinoise system. The adaptive signal-processing circuit will be described later.

One or a plurality of positions at which loudspeakers are mounted are selected as follows.

Figure 4:
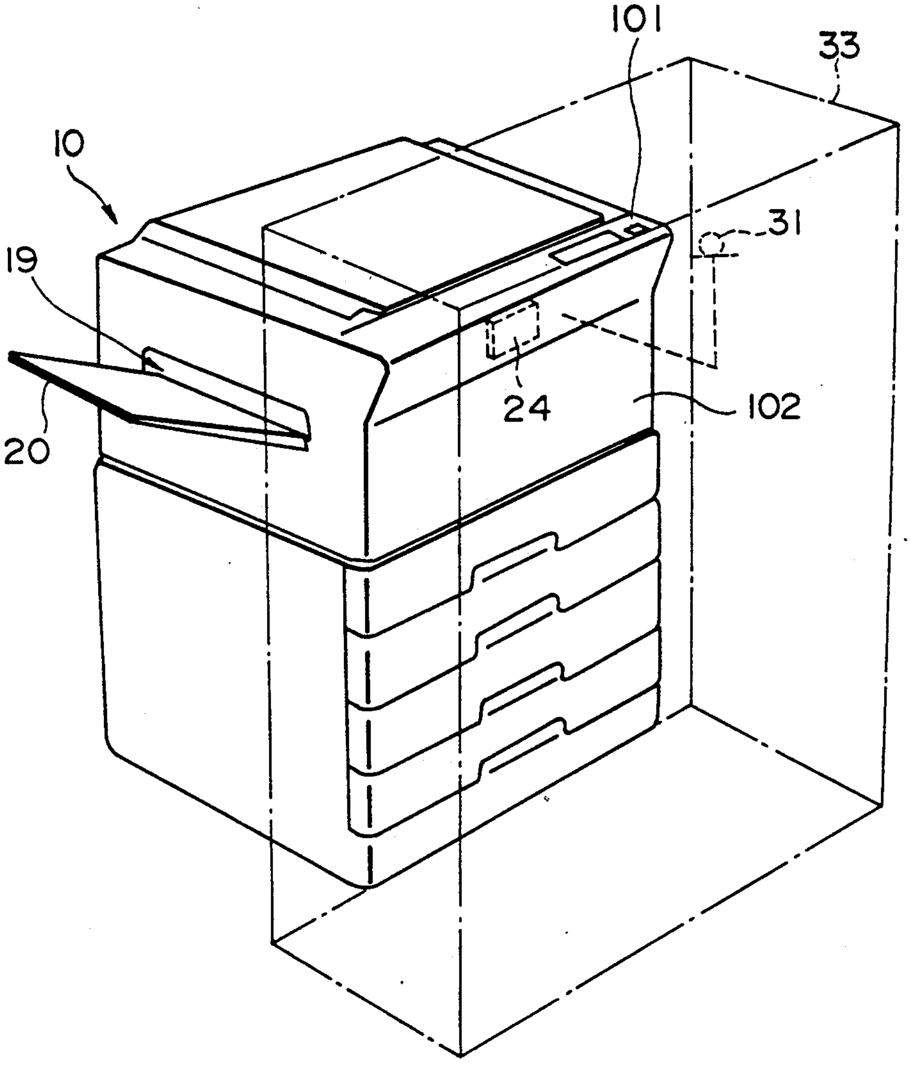
FIG. 4 is a diagram illustrating a area in which noises should be reduced.

An operator usually operates the copy machine 10 in front of an operation panel thereof. Thus, an antinoise area 33 is set so as to be adjacent to the operation panel 101 of the copy machine, as shown in FIG. 4. In this case, the loudspeaker 24 is mounted, for example, on a front panel 102 so that the control sound output from the loudspeaker 24 is radiated in the antinoise area 33.

Figure 5:
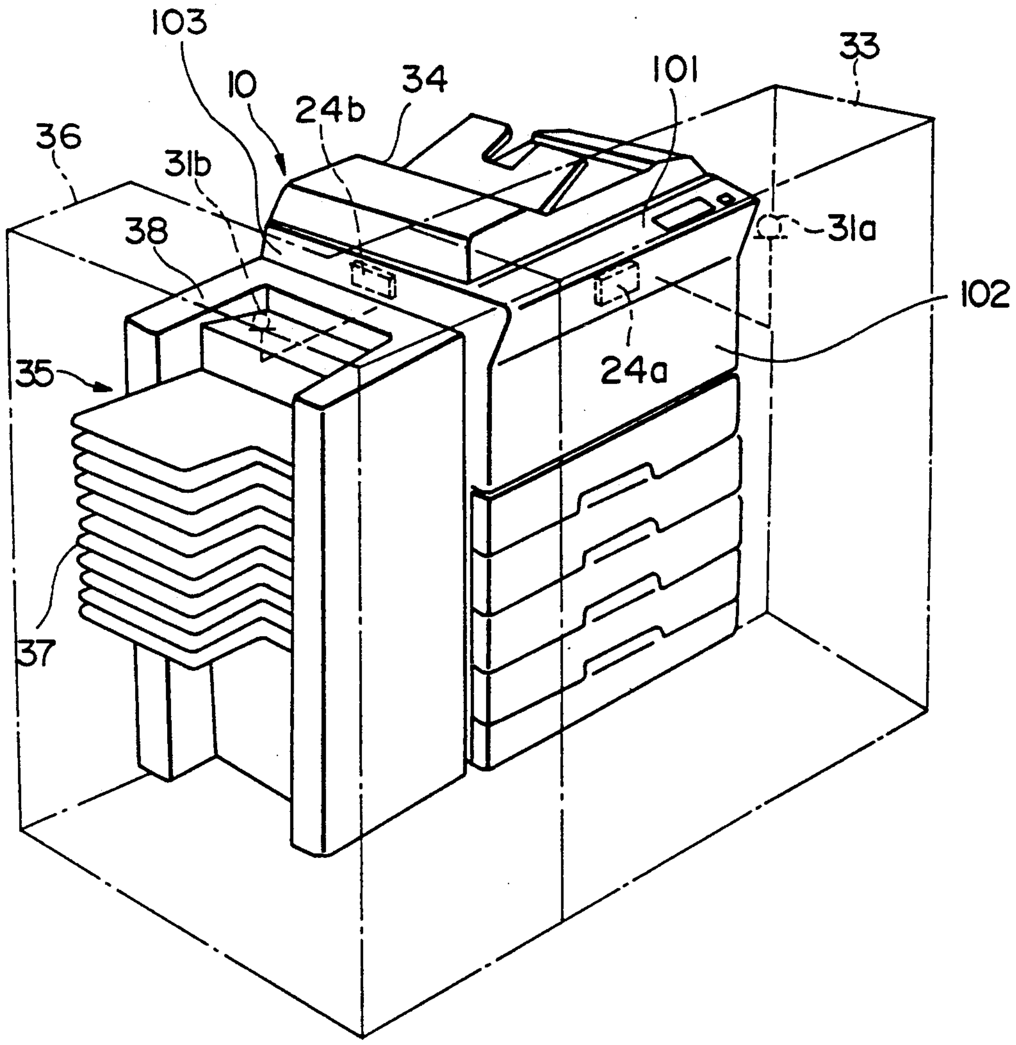
FIG. 5 is a diagram illustrating areas in which noises should be reduced.

In a case where peripheral equipments; an automatic document feeder unit 34 and a sorter unit 35 are integrated with the copy machine 10, an operator may operate the sorter unit 35 at a side of the sorter unit 35. Thus, a first reduction area 33 is set so as to be adjacent to the operation panel 101, and further a second reduction area 36 is set so as to be adjacent to the sorter unit 35, as shown in FIG. 5. In this case, a first loudspeaker **24*a* is mounted, for example, on the front panel 102 and a second loudspeaker 24*b* is mounted, for example, on an upper part of a side panel 103 of the copy machine 10**.

The filter coefficients in the digital filter 27 is determined as follows.

Figure 3:
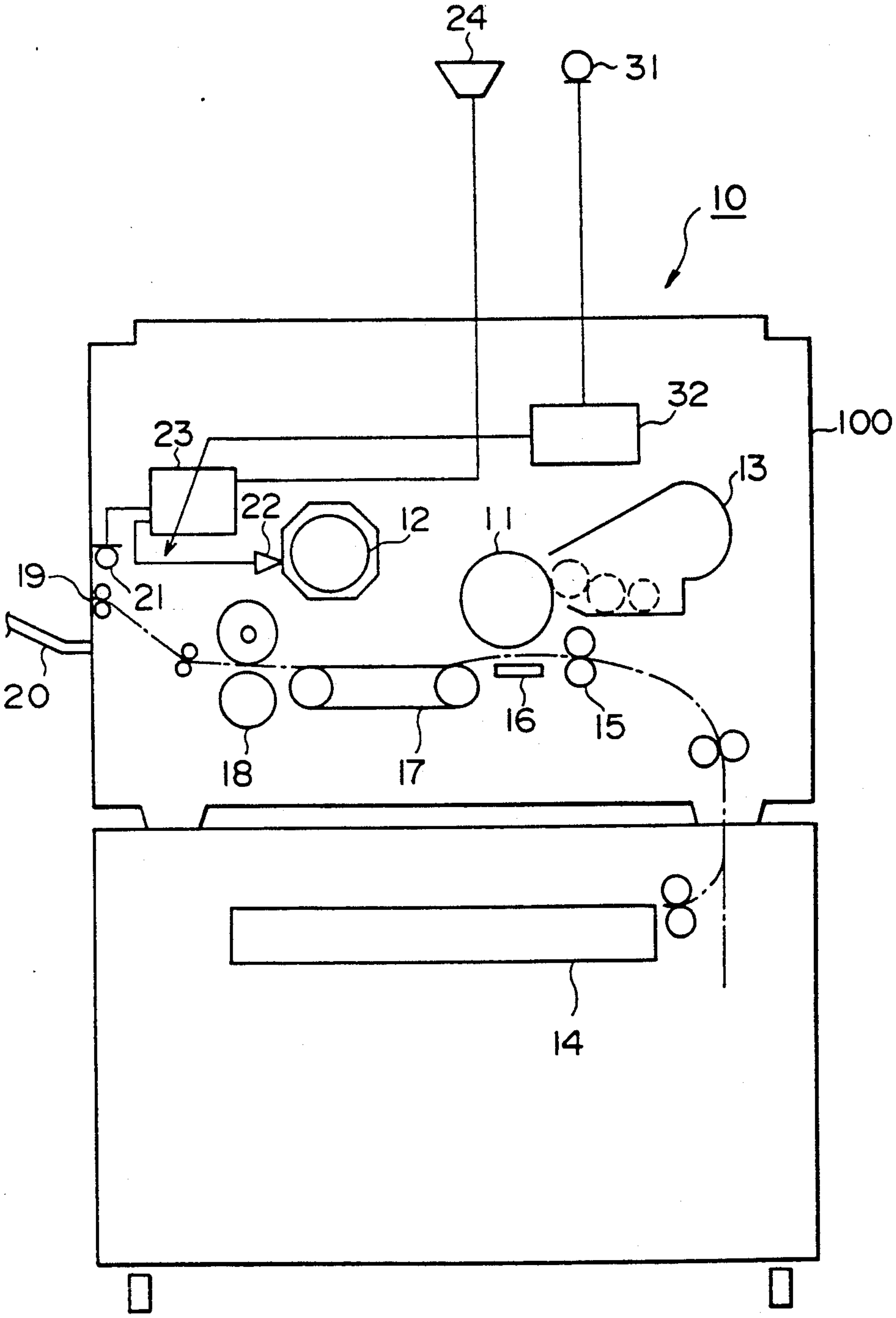
FIG. 3 is a diagram illustrating the copy machine in a case where filter coefficients of digital filter are set up.

Immediately after the copy machine 10 is set up or when a power supply of the copy machine 10 is turned on, an operation for determining the filter coefficient in the digital filter 27 is performed. A microphone 31 (**31*a*, 31*b*) for sampling sounds is set up in each antinoise area, as shown in FIGS. 3, 4 and 5. It is preferable that the microphone 31 for sampling sounds in each antinoise area be set up at a position corresponding to a head of the operator. The microphone 31 is connected to an adaptive signal-processing circuit 32. While copy machine 10 is being driven, the adaptive signal-processing circuit 32 adjusts the filter coefficients in the digital filter 27 based on sounds sampled by the microphone 31**.

Figure 6:
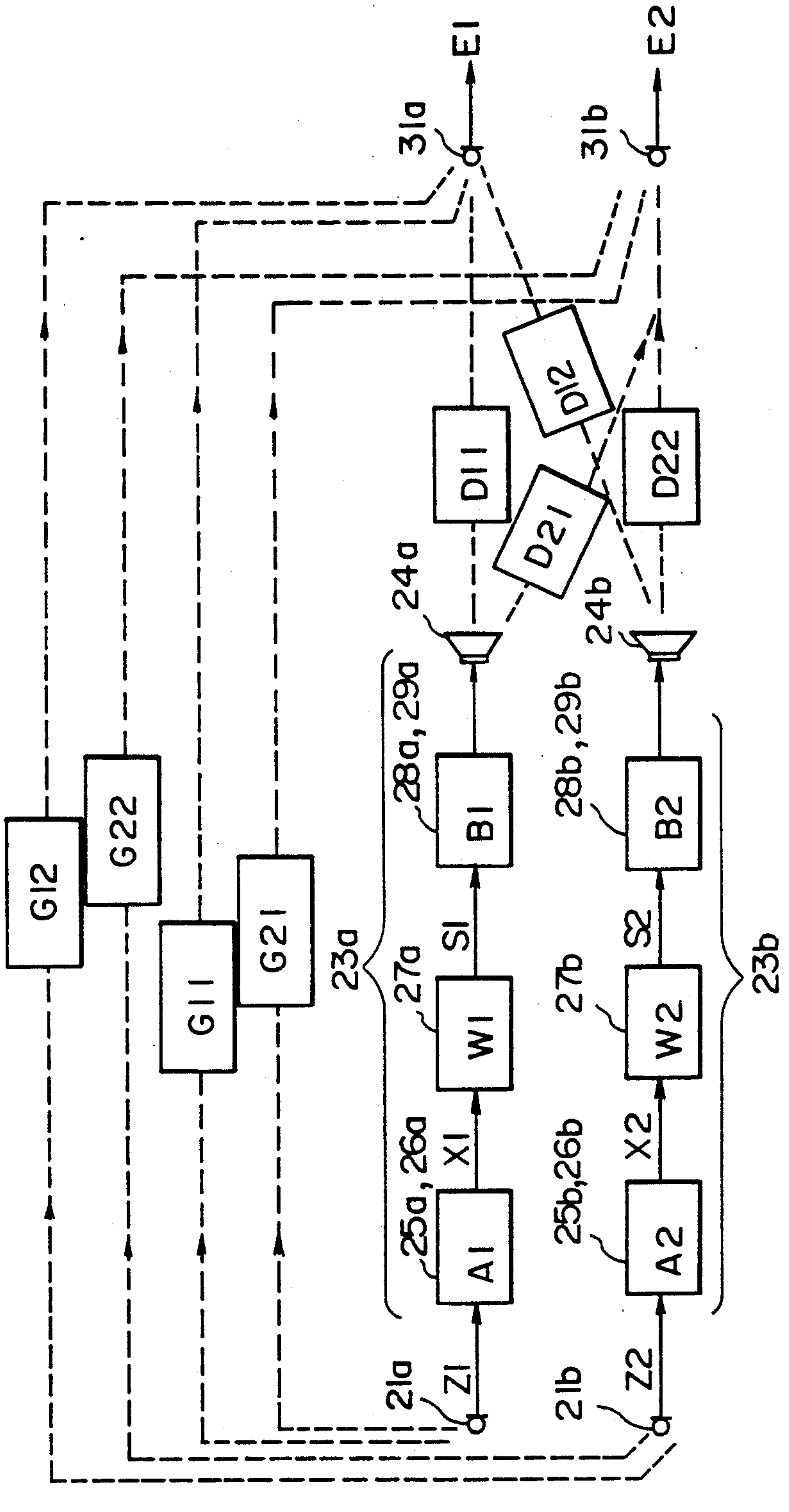
FIG. 6 is a diagram illustrating transfer functions representing an antinoise system having two areas in which noises should be reduced.

In a case where two antinoise areas are set around the copy machine 10 as shown in FIG. 5, a first signal processing circuit **23*a* is provided between the first microphone 21*a* and the first loudspeaker 24*a*, and a second signal processing circuit 23*b* is provided between the second microphone 21*b* and the second loudspeaker 24*b*, as shown in FIG. 6. The first and second signal processing circuits 23*a* and 23*b* respectively have the first low-pass filters 25*a* and 25*b*, the analog to digital converters 26*a* and 26*b*, the digital filters 27*a* and 27*b*, the digital to analog converters 28*a* and 28*b*, the second low pass filters 29*a* and 29*b* and the power amplifiers 30*a* and 30*b*, in the same manner as that shown in FIG. 2. Referring to FIG. 6, a first noise Z1 at a position of the first microphone 21*a* is detected by the first microphone 21*a*. The first noise Z1 passes through the first low-pass filter 25*a* and the analog to digital filter 26*a* by a transfer function A1. An output signal λ1 from the analog to digital converter 26*a* passes through the digital filter 27*a* by a transfer function W1. An output signal S1 of the digital filter 27*a* passes through the digital to analog converter 28*a* and the second low-pass filter 29*a* by a transfer function B1. An output signal from the second low-pass filter 29*a* is amplified by the amplifier 30*a* and converted to a acoustic wave by the first loudspeaker 24*a*. The acoustic wave output from the first loudspeaker 24*a* is transmitted in space to the first antinoise area 33, in which the microphone 31*a* is set up, by a transfer function D11. The acoustic wave output from the first loudspeaker 24*a* is also transmitted in space to the second antinoise 36, in which the microphone for sampling noises is set up, by a transfer function D21. A second noise Z2 at a position of the second microphone 21*b* is detected by the second microphone 21*b*. The second noise Z2 is processed by the second signal processing circuit 23*b* in the same manner as the first noise Z1 in the first signal processing circuit 23*b*. A transfer function of a block including the first low-pass filter 25*b* and the analog to digital converter 26*b* is represented by A2. A transfer function of the digital filter 27 is represented by W2. A transfer function of a block including the digital to analog converter 28*b* and the second low-pass filter 29*b* is represented by B2. An acoustic wave output from the second loudspeaker 24*b* is transmitted in space to the second antinoise area 36, in which the microphone for sampling noises is set up, by a transfer function D22. The acoustic wave output from the second loudspeaker 24*b* is transmitted in space to the first antinoise area by a transfer function D12. In addition, the first noise Z1 at the fist microphone 21*a* is transmitted in space to the microphone 31*a* in the first antinoise area 33 by a transfer function G11, and transmitted in space to the microphone 31*b* in the second antinoise area 36 by a transfer function G21. The second noise Z2 at the second microphone 21*b* is transmitted in space to the microphone 31*b* in the second antinoise area 36 by a transfer function G22, and transmitted in space to the microphone 31*a* in the first antinoise area 33** by a transfer function G12.

In the above condition shown in FIG. 6, a transfer function Cij (i, j=1 or 2) from an output of the j-th digital filter (**27*a* or 27*b*) to an output of the i-th microphone (31*a* or 31*b***) is denoted by the following formula;

$$Cij=Dij.Bj$$

where Dij is a transfer function from the i-th loudspeaker (**24*a* or 24*b*) to the j-th microphone (31*a* or 31*b*), and Bj is a transfer function of the block including the j-th digital to analog converter (28*a* or 28*b*0 and the j-th second low-pass filter (29*a* or 29*b***).

An output signal Ei (E1 or E2) from the i-th microphone (**31*a* or 31*b***) is denoted by the following formulas;

$$Ei=Pi+Qi$$

$$Pi=Gi1\cdot Z1+Gi2\cdot Z2$$

$$Qi=Di1\cdot B1\cdot W1\cdot A1\cdot Z1+Di2\cdot B2\cdot W2\cdot A2\cdot Z2$$

where Pi is a noise detected by the i-th microphone (**31*a* or 31*b*), and Qi is a control sound transmitted from the first and second loudspeakers 24*a* and 24*b* to the i-th microphone (31*a* or 31*b***).

In the above formulas, the transfer functions W1 and W2 respectively corresponds to filter coefficients in the digital filters **27*a* and 27*b*. The filter coefficients W1 and W2 are determined so that the output signals Ei (E1 and E2) of the microphones 31*a* and 31*b* reach "0". If the filter coefficients W1 and W2 in the digital filters 27*a* and 27*b* are determined as described above, a level of the noise present in each of the first and second antinoise area 33 and 36** can be reduced.

Figure 7:
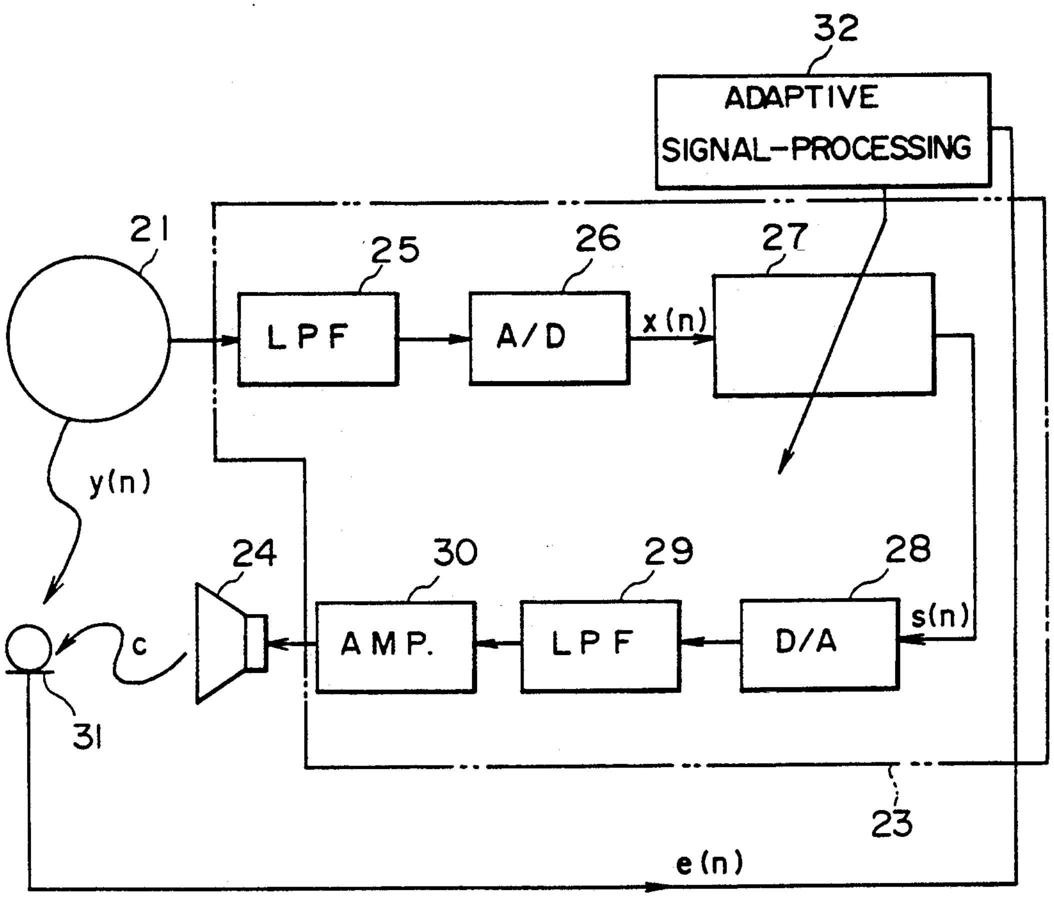
FIG. 7 is a block diagram illustrating a signal processing circuit and an adaptive signal-processing circuit.

The adaptive signal-processing circuit 32 determines the filter coefficient W in accordance with, for example, a filtered-X LMS algorithm which is well-known as the coefficient renewal rule executed by the adaptive signal-processing circuit 32. For the sake of simplicity, it is assumed that only one antinoise area 33 is set in front of the front panel of the copy machine. (see FIG. 4). In this case, the signal processing circuit 23 including the digital filter 2 and the adaptive signal processing circuit 32 for determining the filter coefficient in the digital filter 27 are formed, as shown in FIG. 7.

A transfer function C between an output of the digital filter 27 and an output of the microphone 31 has been previously measured in accordance with the well-known LMS algorithm or cross-spectrum algorithm. After this, the copy machine is operated so that noises are generated. In this state, the following process is carried out.

The output signal e(n) of the microphone 31 in the antinoise area at a time n ("n" representing discrete time) is represented by the following formula (1);

$$e(n) = y(n) + \Sigma cj \cdot s(n-i)$$

$$s(n) = \Sigma wi(n) \cdot x(n-1) \quad (1)$$

where x(n) is an output signal of the analog to digital converter 26, c is a transfer function between digital filter 27 and the microphone 31, G is a transfer coefficient between a noise source and the microphone in space, y(n) is a noise transmitted in space from the noise source to the microphone 31 and s(n) is an output signal of the digital filter 27, as shown in FIG.7.

The filter coefficient "w" is renewed for each sample by the adaptive signal-processing circuit 32 so that a square error $E(n) = e(n)^2$ decreases. Thus, if it is assumed that E(n) is a quadratic equation with respect to "wi", "wi" is renewed so that a value "y" represented by $$Y = E(n) \quad (2)$$

decreases. In this case, the filter coefficient wi(n+1) at a time (n+1) is defined as $$wi(n+1) = wi(n) + \Delta wi(n) \quad (3)$$

where $\Delta\, wi(n) = \alpha \cdot e(n) \cdot \Sigma cj \cdot x(n-i-j)$ and $\alpha$ represents a convergent coefficient.

When the filter coefficient is settled as described above, the filter coefficient is stored in a antinoise system. Then the microphone 31 set up in each antinoise area is removed therefrom.

Figure 8:
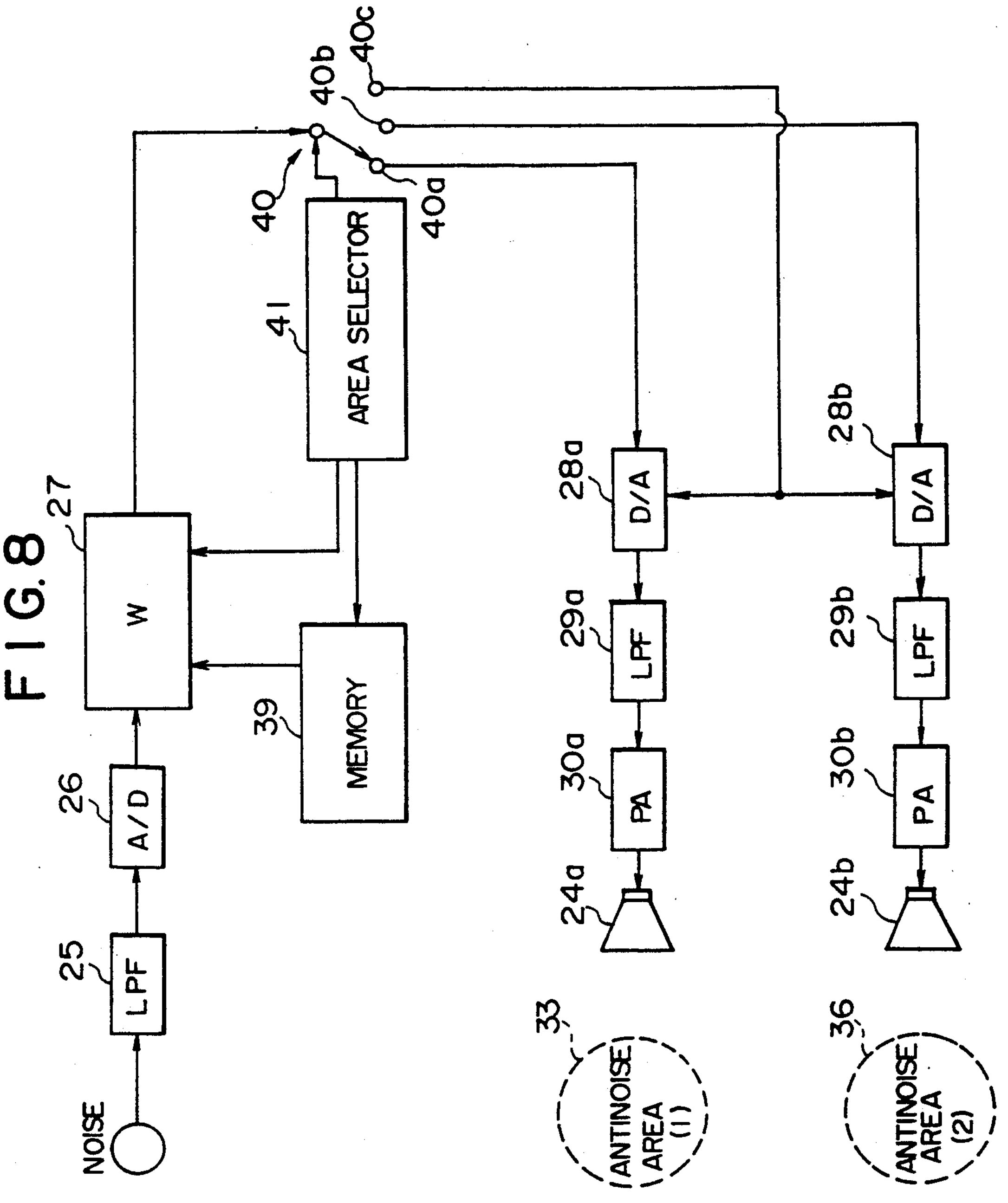
FIG. 8 is an antinoise system according to the first embodiment of the present invention.

A antinoise system is formed as shown in FIG. 8.

Referring to FIG. 8, a signal output from the microphone 21 located close to the noise source in the housing 100 is supplied to the digital filter 27 via the first low-pass filter 25 and the analog to digital converter 26. A coefficient table has been previously stored in a memory 39. The coefficient table indicates relationships between operation modes which can be performed in the copy machine 10 and the filter coefficients determined as described above. For example, in an operation mode in which peripheral equipment (such as an automatic document feeder 34 and sorter unit 35) are used, the operator may stand in the second antinoise area 36. In an operation mode in which the peripheral equipments are not used, the operator operates almost usually in only the first antinoise area. That is, it can be assumed that the antinoise area corresponds to the operation mode. Thus, in the coefficient table stored in the memory 39, each of the filter coefficients corresponds to one of the operation modes which can be performed in the copy machine 10.

The first and second loudspeakers **24*a* and 24*b* are mounted on the copy machine 10 as shown in FIG. 5 so that the first and second antinoise areas 33 and 36 are set around the copy machine 10. A first set of the digital to analog converter 28*a*, the second low-pass filter 29*a* and the power amplifier 30*a* is coupled to the first loudspeaker 24*a*. digital. A second set of the digital to analog converter 28*b*, the second low-pass filter 29*b* and the power amplifier 30*b* is coupled to the second loudspeaker 24*a*. A area selector 41 controls the memory 39, digital filter 27 and a switching circuit 40. The switching circuit 40 is connected to the digital filter circuit 27 and a fist terminal 40*a*, a second terminal 40*a* and a third terminal 40*c*. The first terminal 40*a* is connected to the digital to analog converter 28*a* in the first set. The second terminal 40*a* is connected to the digital to analog converter 28*b* in the second set. The third terminal 40*c* is connected to both the digital to analog converters 28*a* and 28*b*. The area selector 41 switches the switching circuit 40 to one of the terminals 40*a*, 40*b* and 40*c* in accordance with an operation mode requested by the operator. The area selector 41 selects a filter coefficient with reference to the coefficient table stored in the memory 39. The filter coefficient selected by the area selector 41 is supplied from the memory 39 the digital filter 27**.

Figure 9:
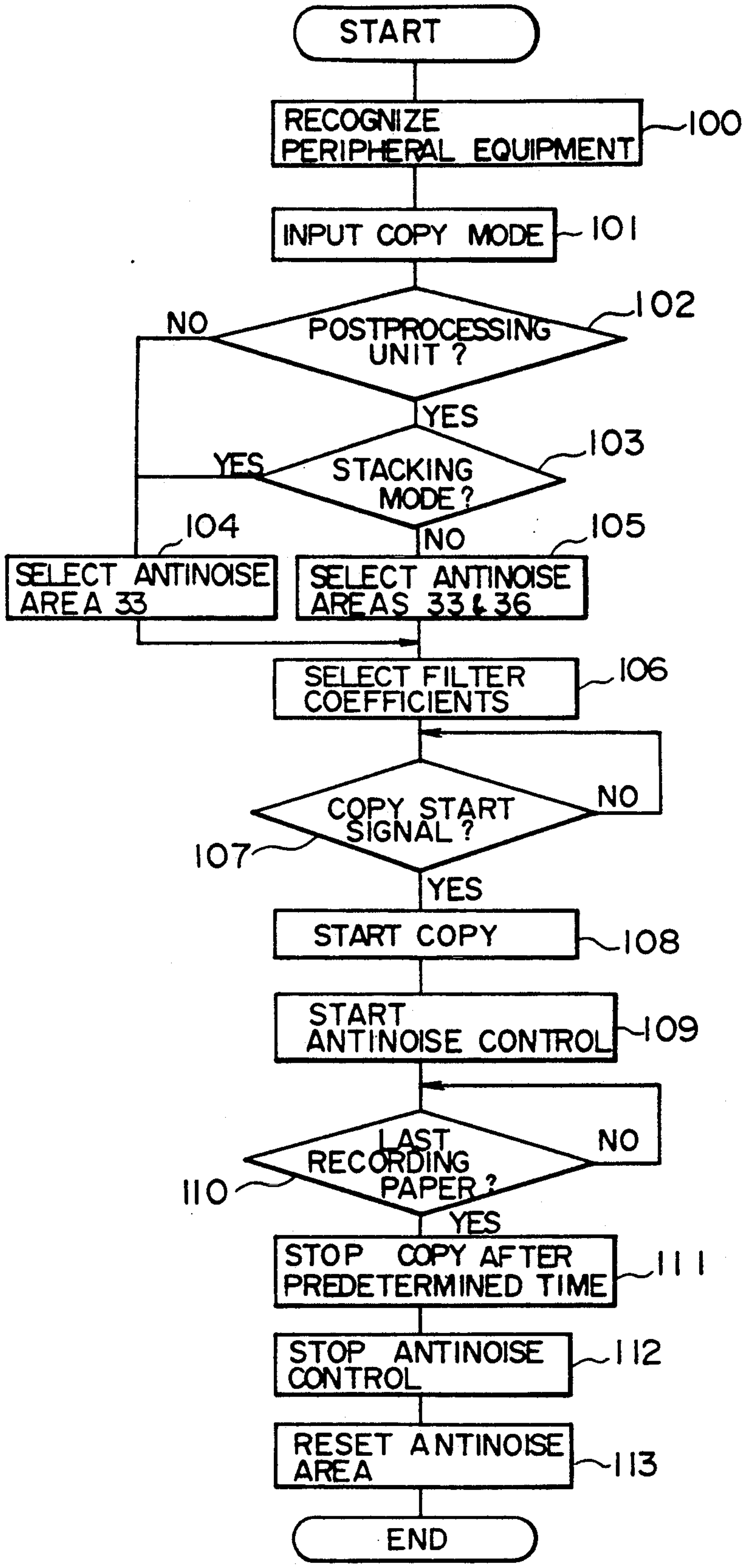
FIG. 9 is a flow chart illustrating a process for reducing noises in each of areas.

The antinoise system shown in FIG. 8 operates in accordance with a process shown in FIG. 9.

Referring to FIG. 9, step 100 recognizes types of peripheral equipments integrated with the copy machine 10. Step 101 obtains a request of a copy mode. Then, step 102 determines whether or not a postprocessing unit such as the sorter unit 35 is integrated with the copy machine 10. In a case where the sorter unit 35 is integrated with the copy machine 10, the process proceeds to step 103. Step 103 determines whether an operation mode requested by the operator is a stacking mode or a sorting mode. The stacking mode is a mode in which recording papers are ejected to a stacking tray 38 positioned at the highest position of the sorter unit 35 (see FIG. 5). The sorting mode is a mode in which recording papers are separately ejected to bins 37 of the sorter unit 35. In the stacking mode, the operator almost usually operates the copy machine in the first antinoise area 33. In the stacking mode, the operator operates the copy machine in either the first antinoise area 33 or the second antinoise area 36. When step 103 determines that the operation mode requested by the operator is the stacking mode (YES), step 104 selects only the first antinoise area **33*d*. Then step 106 controls the area selector 41 so that the switch circuit 40 is switched to the first terminal 40*a* and the filter coefficient corresponding to the first antinoise area 33** is selected. After this, step 107 determines whether or not a copy start signal is supplied to the copy machine 10. When the result obtained by step 107 is YES, step 108 controls the copy machine 10 so that the copy machine 10 starts a process in accordance with the copy mode. Then step 109 controls the antinoise system shown in FIG. 8 so that the antinoise system starts a process for reducing the noise present in the first antinoise area 33. That is, the filter coefficient corresponding to the first antinoise area 33 is supplied from the memory 39 to the digital filter 27. The noise detected by the microphone 21 located close to the noise source in the housing 100 is processed by the digital filter 27 having the filter coefficient corresponding to the first antinoise area 33. Then the signal output from the digital filter 27 is supplied to the first loudspeaker 24*a* via the first set of the digital to analog converter 28*a*, the second low-pass filter 20*a* and the power amplifier 30*a*. As a result, the first loudspeaker 24*a* outputs an acoustic wave corresponding to the noise detected by the microphone 21 so that the acoustic wave and the noise transmitted from the noise source to the first antinoise area 33 cancel out.

After step 109, step 110 determines whether or not a last paper is ejected to the stacking tray 38. When the result obtained by step 100 is YES, step 111 stops the operation of copies after a predetermined time. Then step 112 controls the antinoise system so that the antinoise system stops the process for reducing the noise present in the first antinoise area 33. Step 113 resets information regarding the antinoise area selected in step 104.

On the other hand, step 103 determines that the operation mode requested by the operator is the sorting mode, step 105 selects both the first and second antinoise areas 33 and 36. Then step 106 controls the area selector 41 so that the switch circuit 40 is switched to the third terminal 40*c* and the filter coefficient corresponding to a combination of both the first and the second antinoise areas 33 and 36. After this, the process in accordance with steps 107 through 113 is performed. In this process, the filter coefficient corresponding to the combination of both the first and second antinoise area 33 and 36 is supplied from the memory 39 to the digital filter 27. The noise detected by the microphone 21 passes through the digital filter 27 and is supplied to the both the first and second sets of the digital to analog converter 28*a* and 28*b*, the second low-pass filters 29*a* and 29*b* and the power amplifiers 30*a* and 30*b*. As a result, the first and second loudspeakers 24*a* and 24*b* output acoustic waves corresponding to the noise detected by the microphone 21 so that the acoustic waves and the noises transmitted from the noise source to the first and second antinoise areas 33 and 36 cancel out.

In the antinoise system shown in FIG. 8, it is possible to select only the second antinoise area 36. In this case, the area selector 41 switches the switching circuit 41 to the second terminal 40*b*, and the filter coefficient corresponding to only the second antinoise area 36 is supplied from the memory 39 to the digital filter 27.

According to the antinoise system shown in FIG. 8, as the area selector 41 and the switch circuit 40 are provided therein, the noises can be reduced in two antinoise areas by only one digital filter 27. Thus, the antinoise system can be miniaturized, and it is possible to prevent the cost of the antinoise system from increasing.

Figure 10:
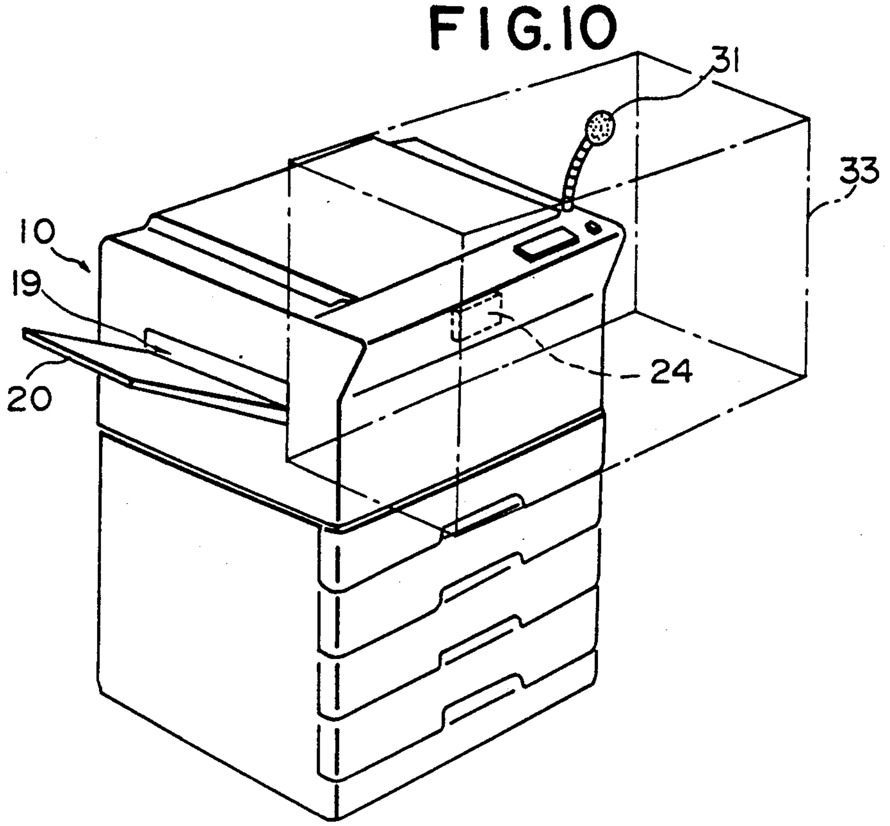
FIGS. 10 and 11 are diagrams illustrating microphones which are fixed on housings of copy machines, each microphones being used for sampling noises in the areas.
Figure 11:
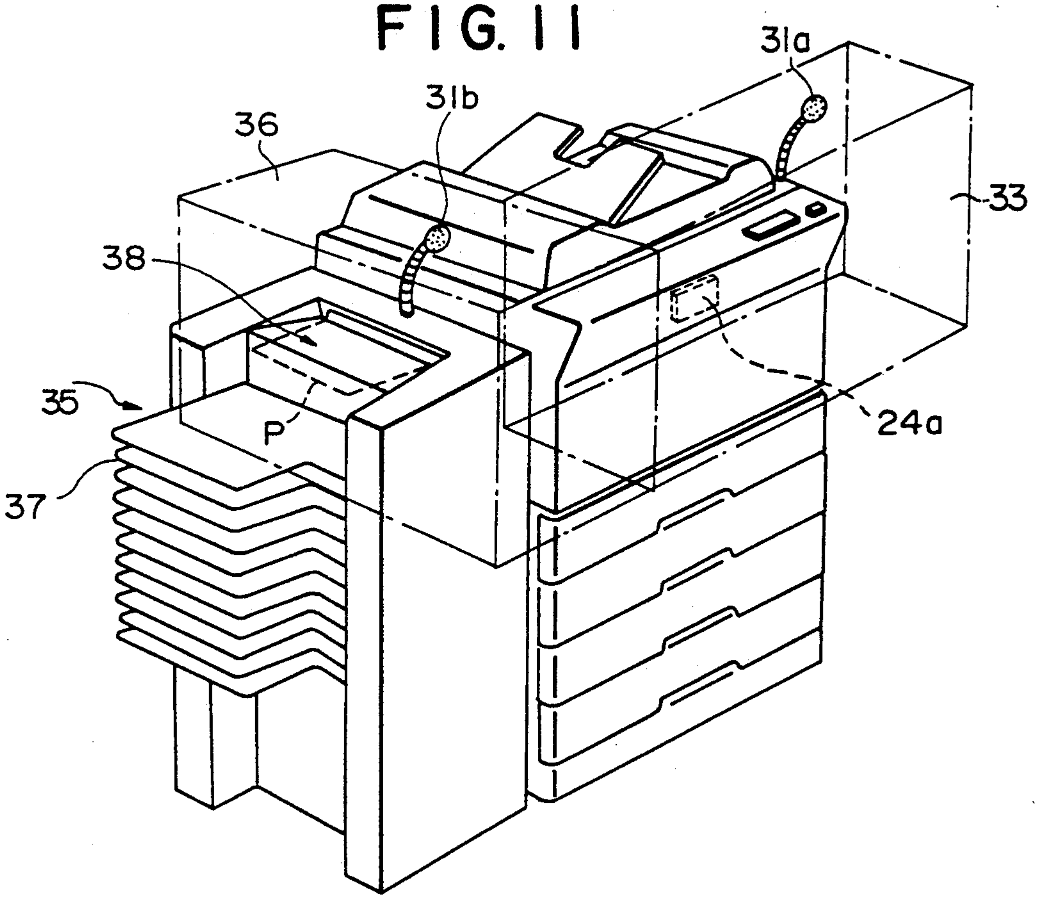

The microphone 31 (31*a* and 31*b*) for sampling noises in each of the antinoise areas 33 and 36 can be usually mounted on the copy machine 10, as shown in FIGS. 10 and 11. If the noise is periodically sampled by the microphone 31 in each of the antinoise areas 33 and 36, the filter coefficient corresponding to each of the antinoise areas 33 and 36 can be updated.

A description will now be given of a second embodiment of the present invention with reference to FIGS. 12 through 19. In the second embodiment of the present invention, each antinoise area is set at a position remote from the copy machine 10.

Figure 12:
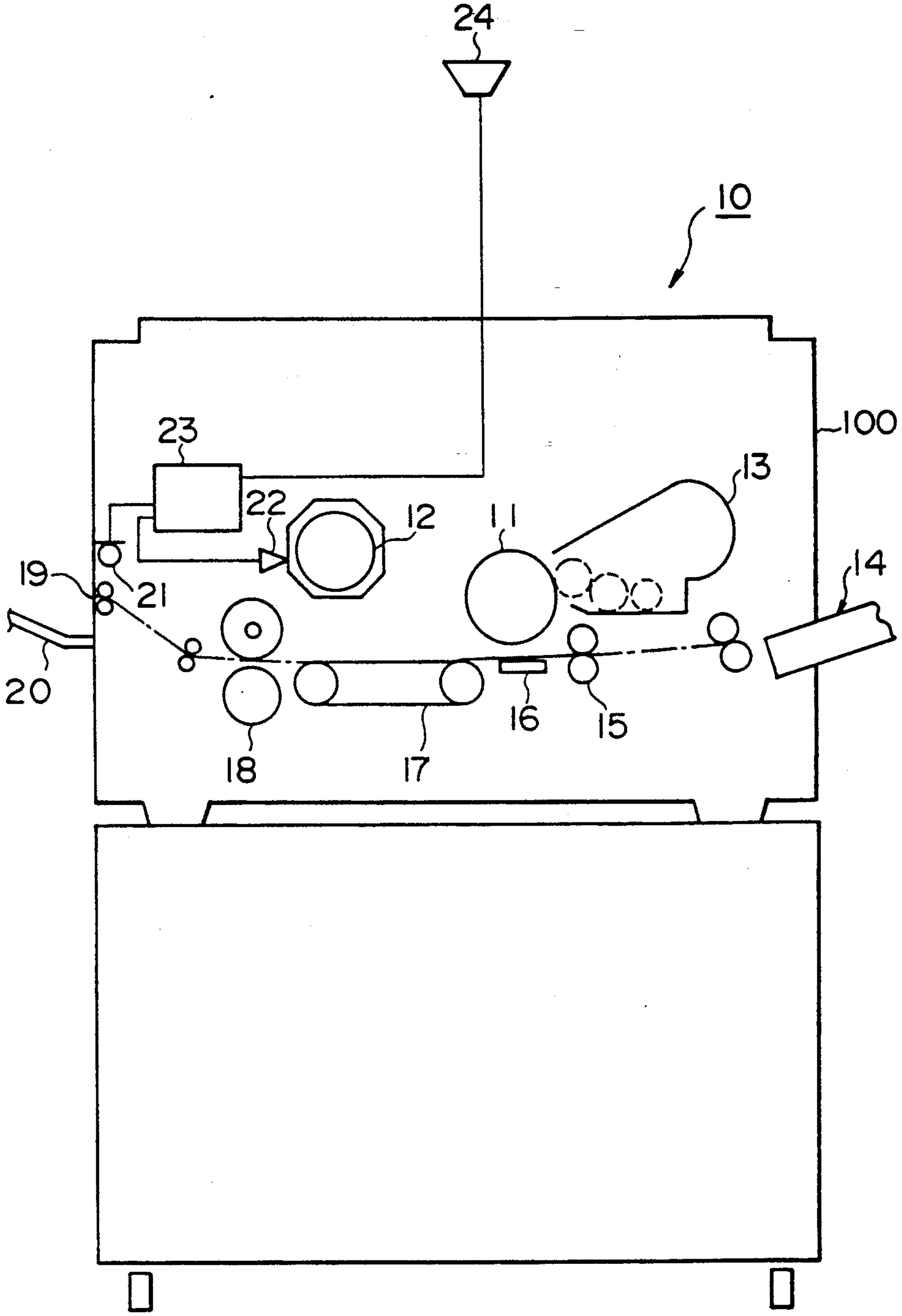
FIG. 12 is a diagram illustrating a copy machine according to a second embodiment of the present invention.

FIG. 12 shows a copy machine provided with an antinoise system. In FIG. 12, those parts which are the same as those shown in FIG. 1 are given the same reference numbers. Referring to FIG. 12, a paper supply cassette 14 is detachably provided to the copy machine 10 so as to project from a side panel of the housing. The loudspeaker 24 is provided in an antinoise area set up at a position remote from the copy machine 10.

Figure 13:
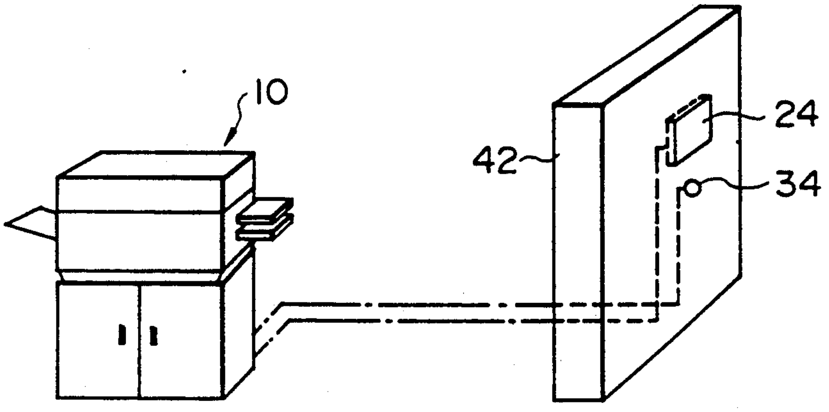
FIGS. 13, 14, 15 and 16 are diagrams illustrating loudspeakers used for reducing noises generated by the copy machine and microphones used for sampling noises.

The antinoise area is set up, for example, adjacent to a partition wall 42, as shown in FIG. 13. In this case, the loudspeaker 24 and a microphone 34 for sampling noises are mounted on the partition wall 42, and the antinoise area is partitioned off by the partition wall 42 from an area in which the copy machine 10 is set up. A filter coefficient corresponding to the antinoise area is determined by the same system as that shown in FIG. 7. When the copy machine 10 is operated in the copy mode, an acoustic wave output from the loudspeaker 24 and noise caused by the operation of the copy machine 10 cancel out. As a result, the noise present in the antinoise area adjacent to the partition wall 42 can be reduced. In this case, the filter coefficient in the digital filter can be periodically updated by using noise data sampled by the microphone 34.

Figure 14:
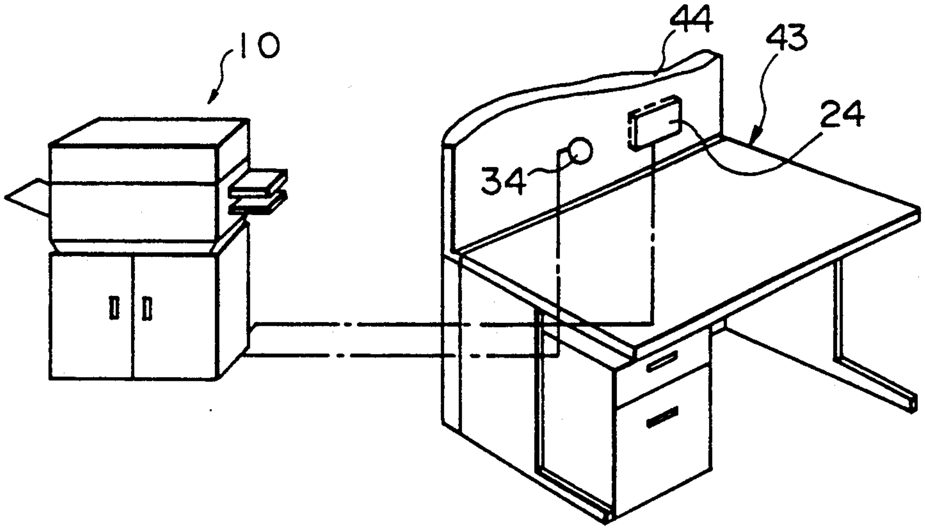

In FIG. 14, the noise cased by operations of the copy machine 10 is reduced in an antinoise area in which a desk 43 is provided. The antinoise area is remote from the copy machine 10. The loudspeaker 24 and the microphone are mounted in a screen 43*a* fixed on a front end of the desk 43. The structure of the antinoise system is the same as that of the first embodiment. The filter coefficient in the digital filter in the antinoise system is determined based on noise data obtained via the microphone 34. Then the acoustic wave output from the loudspeaker 24 and the noise present in the antinoise are at the desk 43 cancel out. In this case, also the filter coefficient in the digital filter can be periodically updated by using noise data sampled by the microphone 34.

Figure 15:
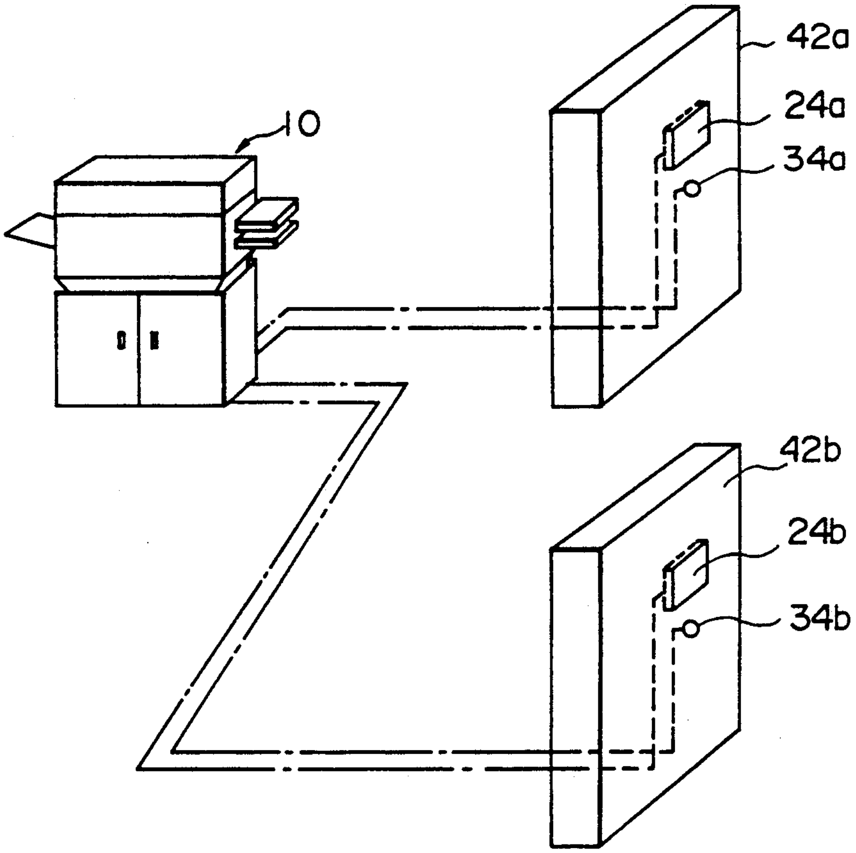
Figure 17:
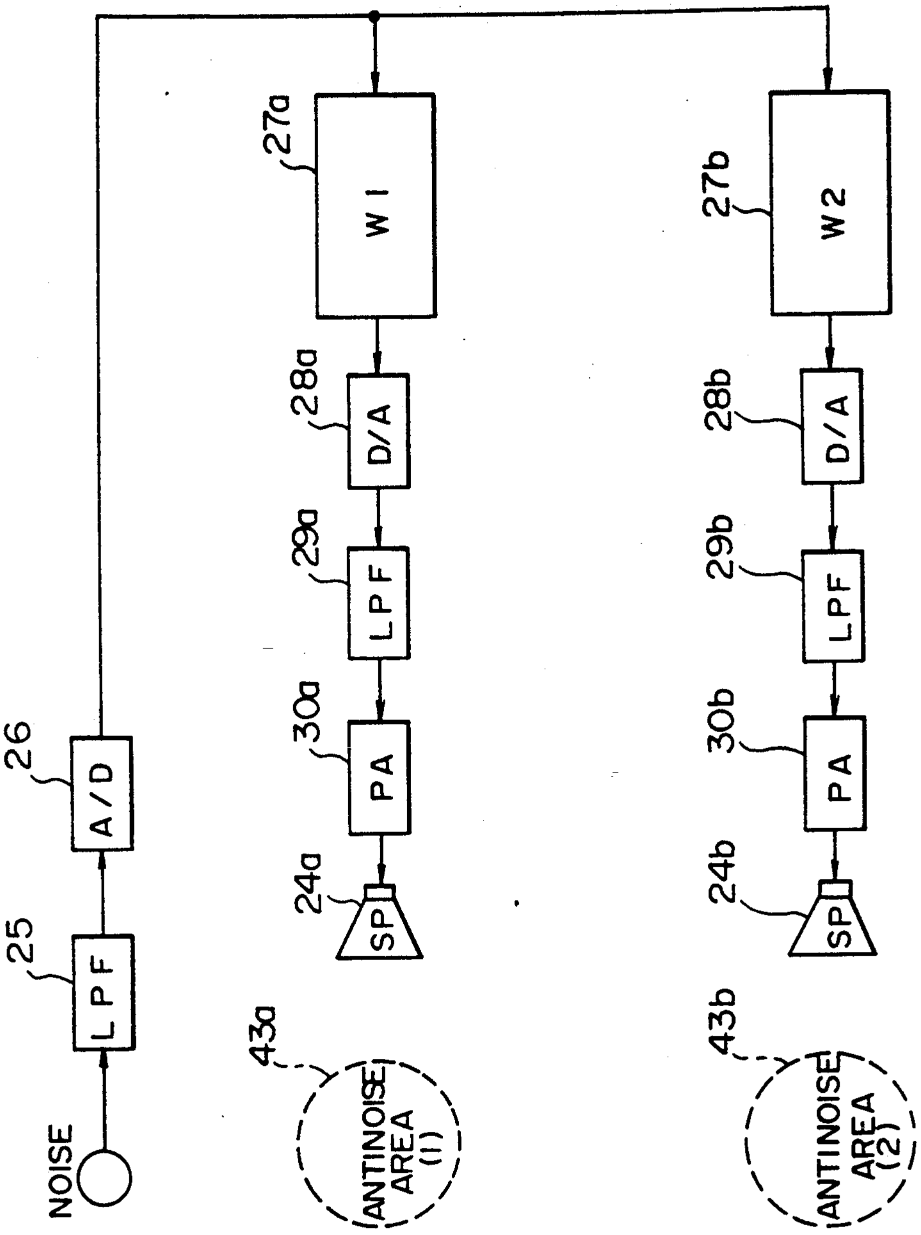
FIG. 17 is a block diagram illustrating an antinoise system according to the second embodiment of the present invention.

In FIG. 15, the noise caused by operations of the copy machine 10 is reduced in two antinoise areas set up adjacent to partition walls 42*a* and 42*b*. The antinoise areas are partitioned by the partition walls 42*a* and 42*b* from an area in which the copy machine 10 is set up. Loud speakers 24*a* and 24*b* and microphones 34*a* and 34*b* respectively mounted in the partition walls 42*a* and 42*b*. In this case, the antinoise system is formed as shown in FIG. 17. In FIG. 17, those parts which are the same as those shown in FIG. 8 are given the same reference numbers. The noise detected by the microphone 21 shown in FIG. 12 is processed by the first low pass filter and the analog to digital converter 26. An output signal from the analog to digital converter 26 is supplied to a first processing circuit corresponding to the antinoise area 45*a* adjacent to the partition wall 42*a* and to a second processing circuit corresponding to the antinoise area 45*b* adjacent to the partition wall 42*b*. The filter coefficient W1 in the digital filter 27*a* of the first processing circuit has been previously determined by the adaptive signal-processing circuit based on noise data sampled by the microphone 34*a* mounted in the partition wall 42*a*. Thus, the acoustic wave output form the loudspeaker 24*a* mounted in the partition wall 42*a* and the noise caused by the copy machine 10 cancel out in the antinoise area adjacent to the partition wall 42*a*. As a result, the noise present in the antinoise area adjacent to the partition wall 42*a* is reduced. The filter coefficient W2 in the digital filter 27*b* of the second processing circuit has been previously determined by the adaptive signal-processing circuit based on noise data sampled by microphone 34*b* mounted in the partition wall 42*b*. Thus, the acoustic wave output from the loudspeaker 24*b* mounted in the partition wall 42*b* and the noise caused by the operations of the copy machine 10 cancel out in the antinoise area adjacent ot the partition wall 42*b*.

Figure 16:
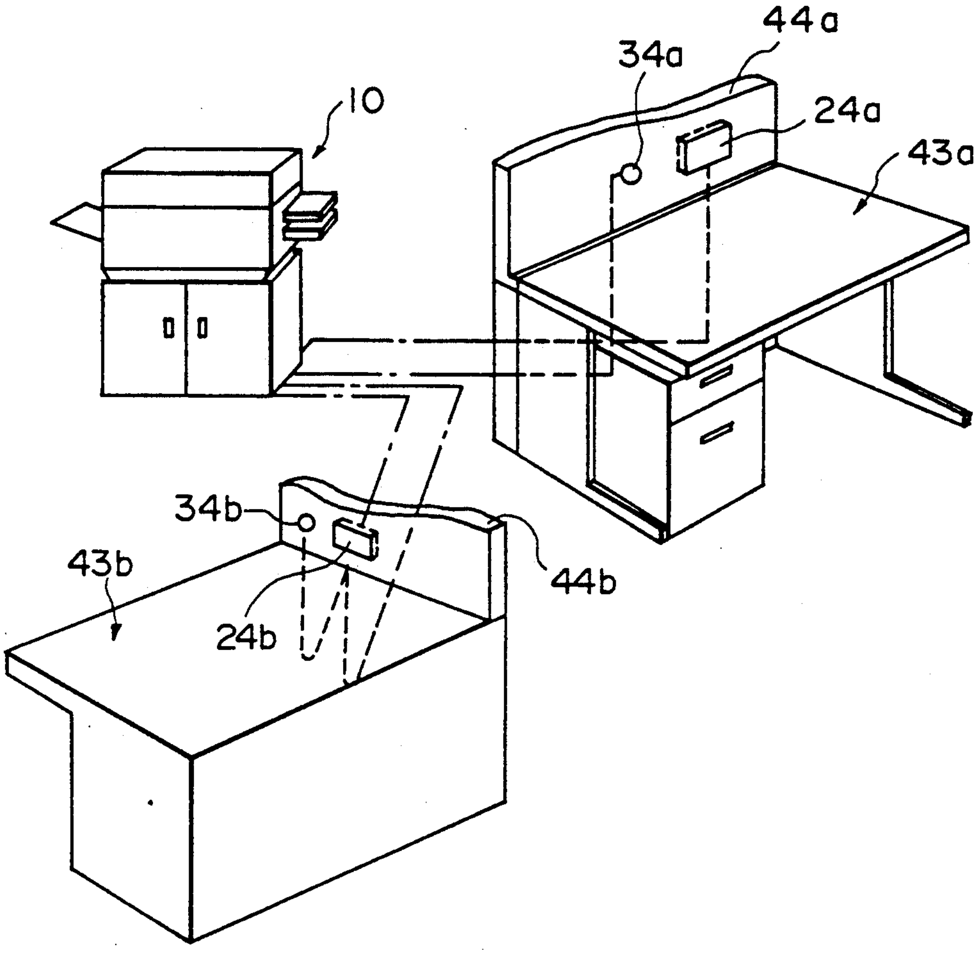

In FIG. 16, the noise caused by the operations of the copy machine is reduced in two antinoise areas 45*a* and 45*b* in which desks 43*a* and 43*b* are respectively provided. A loudspeaker 24*a* and a microphone 34*a* are mounted in a screen 44*a* fixed on the front end of the desk 45*a*. A loudspeaker 24*b* and a microphone 34*b* are mounted in a screen 44*b* fixed on the front end of the desk 45*b*. A antinoise system for reducing the noises in the antinoise area in which the desks 43*a* and 43*b* has the same structure as that shown in FIG. 17. That is, the acoustic wave output from the loudspeakers 24*a* and 24*b* cancel out the noises caused by the operations of the copy machine 10.

An antinoise system for reducing noises in two antinoise areas remote from the copy machine 10 can be formed as shown in FIG. 8. In this case, key switches for selecting one or two of the antinoise areas are provided on the operation panel. Then the area selector 41 switches the switch circuit 40 to one of the terminals 40*a*, 40*b* and 40*c* in accordance with instruction signals from the key switches.

Sensors can be mounted, for example, on chairs provided in the antinoise areas. Each of sensors detects a worker sitting down on a corresponding one of the chairs. In this case, the switch circuit 40 is switched in accordance with detection signals output from the sensors.

A description will now be given of a third embodiment of the present invention with reference to FIGS. 18 and 19.

In the third embodiment, the copy machine 10 is integrated with the peripheral equipment such as the sorter unit 35 as shown in FIG. 5. Then, a first antinoise area 33 is set up in front of the operation panel of the copy machine 10, a second antinoise area 36 is set up at the side of the sorter unit 35, and a third antinoise area 43 is set up adjacent to the partition wall 42 remote from the copy machine 10 as shown in FIG. 13. Thus, the loudspeaker 24*a* is mounted on the front panel 102 of the copy machine 10, the loudspeaker 24*b* is mounted on the side panel 103 of the copy machine 10, and the loudspeaker 24*c* ia mounted in the partition wall 42.

Figure 18:
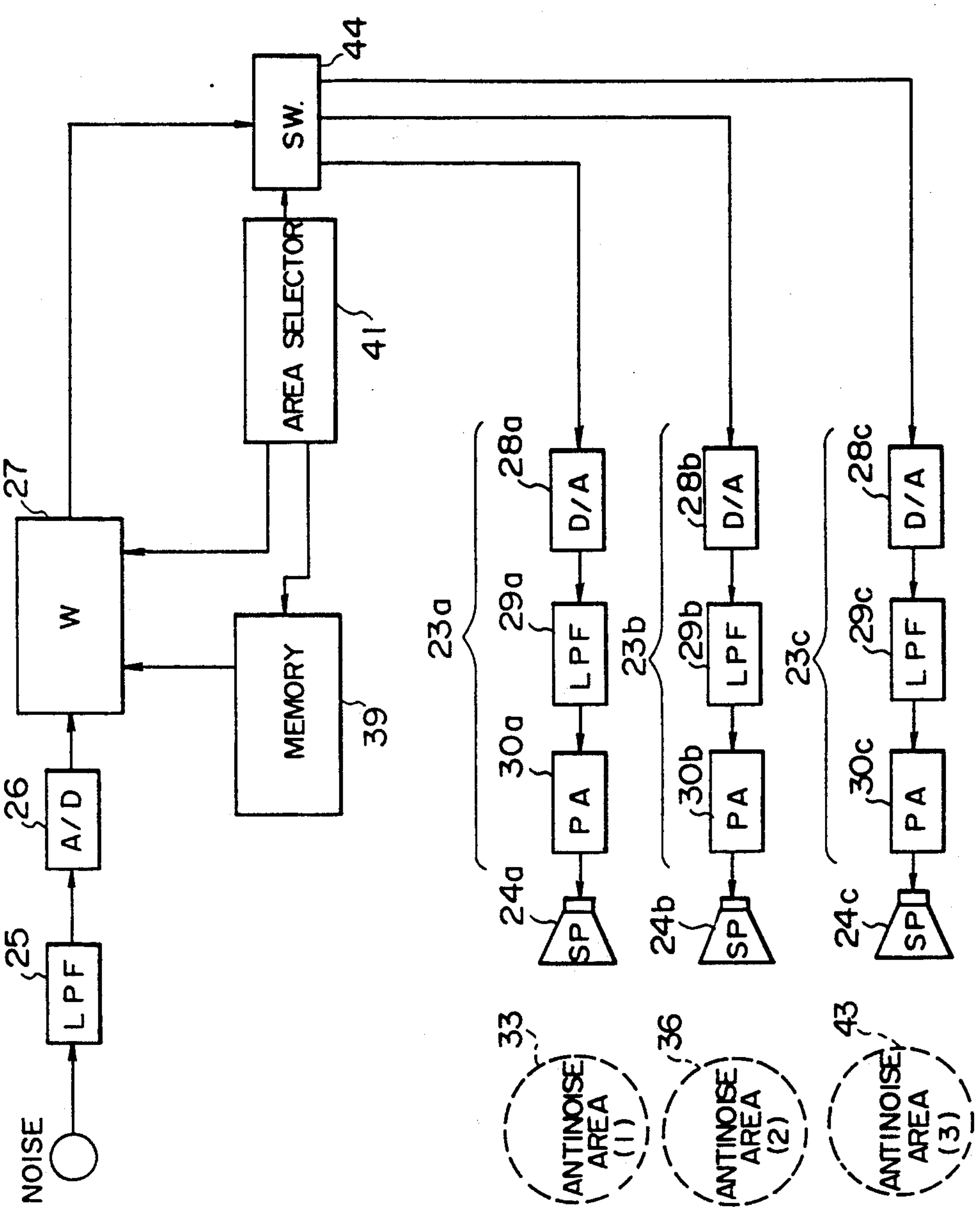
FIG. 18 is a block diagram illustrating an antinoise system according to a third embodiment of the present invention.

A antinoise system is formed as shown in FIG. 18. In FIG. 18, those parts which are the same as those shown in FIG. 8 are given the same reference number.

Referring to FIG. 18, the antinoise system has a memory 39. Filter coefficients used in the digital filer 27 are previously stored in the memory 39. The filter coefficients filter are determined by the adaptive signal-processing circuit based on the noises respectively sampled by the microphones 31*a*, 31*b* and 34. That is, the filter coefficients stored in the memory 39 respectively corresponds to the first, second and third antinoise areas. The antinoise system has also signal processing circuits 23*a*, 23*b* and 23*c* respectively corresponding to the first, second and third antinoise areas. The signal processing circuits 23*a*, 23*b* and 23*c* are selectively activated by a switch circuit 44 controlled in accordance with instructions from an area selector 41.

Figure 19:
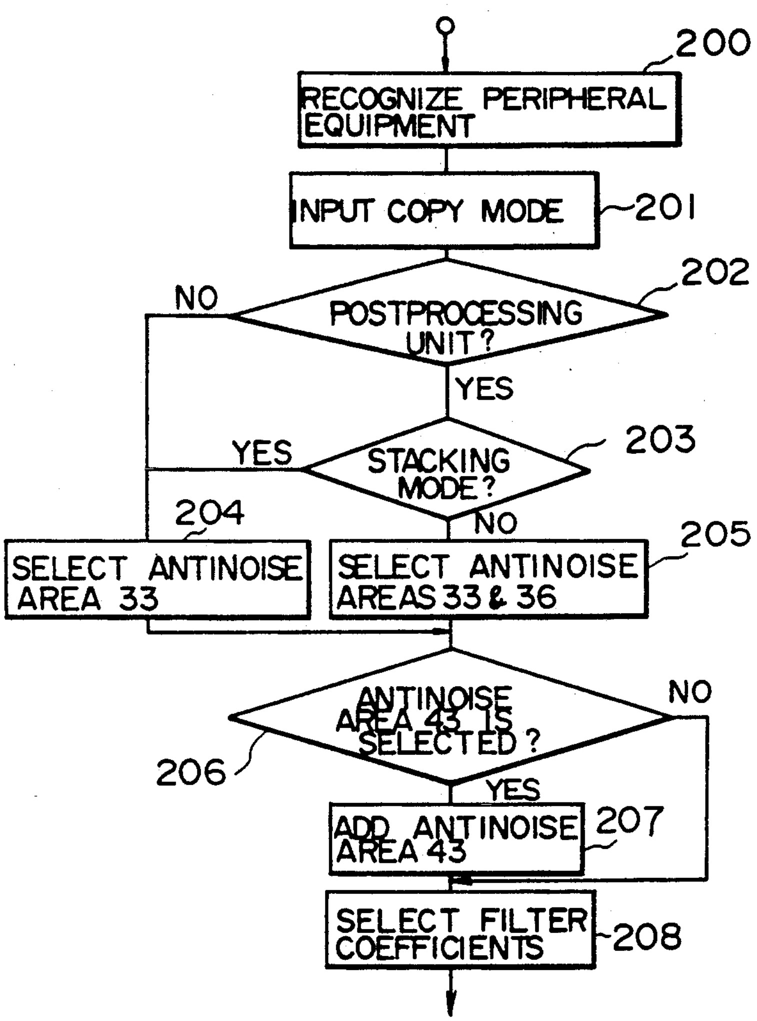
FIG. 19 is a flow chart illustrating a process for reducing noises.

The antinoise system shown in FIG. 18 operates in accordance with a process shown in FIG. 19.

Referring to FIG. 19, step 200 recognizes types of peripheral equipments integrated with the copy machine 10. Step 201 obtains a request of a copy mode. Then, step 202 determines whether or not a postprocessing unit such as the sorter unit 35 is integrated with the copy machine 10. In a case where the sorter unit 35 is integrated with the copy machine 10, the process proceeds to step 203. Step 203 determines whether an operation mode requested by the operator is a stacking mode or a sorting mode. When step 203 determines that the operation mode requested by the operator is the stacking mode (YES), step 204 selects only the first antinoise area 33. Then step 206 determines whether or not the third antinoise area 43 remote from the copy machine 10 is requested by the user. A key switch for requesting the third antinoise area 43 is provided on the operation panel. If the operator operates the key switch, the result in step 206 determines that the third antinoise area is requested. When the result obtained in step 206 is YES, step 207 defines the third antinoise area 43 as an area in which the noise should be reduced. Then, step 208 controls the area selector 41 so that the switch circuit 40 activates the first and third signal processing circuit 23*a* and 23*c* and the filter coefficients corresponding to the first and third antinoise areas 33 and 43 are selected. After this, when the copy machine is driven, the selected filter coefficients corresponding to the first and third antinoise areas 33 and 43 are supplied from the memory 39 to the digital filter 27. Then signals processed by using the selected filter coefficients in the digital filter 29 respectively supplied to the first and third signal processing circuits 23*a* and 23*c* via the switch circuit 44. As a result, acoustic waves output from the loudspeakers 24*a* and 24*c* respectively cancel the noises caused by the operations of the copy machine 10 in the first and third antinoise areas 33 and 43.

In the above processing flow, when step 206 determines that the third antinoise area 43 is not requested, the process proceeds from step 206 to step 208 directly. Thus, the noise present in only the first antinoise area 33 is reduced.

In addition, when the results obtained in steps 202 and 203 are YES, the process in accordance with steps 204 through 208 are carried out in the same manner as described above.

When step 203 determines that the selected mode is not the stacking mode, step 205 selects the antinoise areas 33 and 36. Then steps 206 through 208 are carried out. In this case, when step 206 determines that the third antinoise area 43 is requested, the filter coefficients corresponding to all the first, second and third antinoise areas 33, 36 and 43 are supplied from the memory 39 to the digital filter 27. Thus, the signals processed by using the filtered coefficients corresponding to all the antinoise areas 33, 36 and 43 in the digital filter 27 is respectively supplied to the first, second and third signal processing circuit 23*a*, 23*b* and 23*c* via the switch circuit 40. Then, an acoustic wave for canceling the noise present in each of the antinoise areas is output from a corresponding one of the loudspeakers 24a, 24b and 24c. As a result, the noises caused by the operations of the copy machine 10 can be reduced in all the antinoise areas 33, 36 and 43.

In a case, each of the microphones 31a, 31b and 34 are respectively fixed in a corresponding one of the antinoise areas 33, 36 and 43, the filter coefficients corresponding to the antinoise areas 33, 36 and 43 can be periodically updated.

The present invention is not limited to the aforementioned embodiments, and variations and modifications may be made without departing from the scope of the claimed invention.

What is claimed is:

1. An image forming apparatus comprising:
 a housing;
 a mechanism, mounted in said housing, for forming images on a medium;
 an operation panel formed on said housing, said mechanism being driven in accordance with an operating instruction input from said operation panel by an operator;
 noise detecting means, provided in said housing, for detecting a noise generated by a driving of said mechanism; and
 noise canceling means, coupled to said noise detecting means, for outputting an acoustic wave to an area adjacent to said operation panel of said housing, said acoustic wave being generated based on the noise detected by said detecting means so that said acoustic wave and a noise present in said area cancel out, whereby the noise present in said area is reduced.

2. An apparatus as claimed in claim 1, wherein said noise detecting means includes a detector for detecting a vibration of a driving source in said mechanism.

3. An apparatus as claimed in claim 1, wherein said noise detecting means includes a microphone for detecting a noise present at a predetermined position in said housing.

4. An apparatus as claimed in claim 1, wherein said noise canceling means comprises:
 filter means for filtering a first signal corresponding to the noise detected by said noise detecting means and for outputting a second signal corresponding to said acoustic wave; and
 outputting means for outputting said acoustic wave in accordance with said second signal supplied from said filter means.

5. An apparatus as claimed in claim 4, further comprising:
 memory means for storing a filter coefficient used in a process of said filter means.

6. An apparatus as claimed in claim 5, wherein the filter coefficient stored in said memory means has been previously determined based on a noise detected in said area when said mechanism is driven.

7. An apparatus as claimed in claim 5, wherein:
 said noise detecting means includes a microphone for detecting a noise present in said area when said mechanism is driven; and
 the apparatus further comprises determination means, coupled to said microphone, for determining the filter coefficient used in a process of said filter means based on the noise detected by said microphone,
 wherein said microphone and said determination means are periodically activated so that the filter coefficient stored in said memory means is updated.

8. An apparatus as claimed in claim 7, wherein said determination means has an adaptive signal processing circuit for processing, in accordance with a predetermined algorithm, a signal corresponding to the noise detected by said microphone.

9. An apparatus as claimed in claim 4, wherein said outputting means has a loudspeaker for outputting the acoustic wave.

10. An apparatus as claimed in claim 1, wherein said image forming apparatus is a copy machine.

11. An image forming apparatus comprising:
 a housing;
 a mechanism, mounted in said housing, for forming images on a medium;
 an operation panel formed on said housing, said mechanism being driven in accordance with an operating instruction input from said operation panel by an operator;
 noise detecting means, provided in said housing, for detecting a noise generated by a driving of said mechanism; and
 noise canceling means, coupled to said noise detecting means, for outputting acoustic waves to respective areas, each of said acoustic waves being generated based on the noise detected by said detecting means so that each of said acoustic waves and a noise present in a corresponding one of said areas cancel out, whereby the noise present in each of said areas is reduced.

12. An apparatus as claimed in claim 11, wherein said noise detecting means includes a detector for detecting a vibration of a driving source in said mechanism.

13. An apparatus as claimed in claim 11, wherein said noise detecting means includes a microphone for detecting a noise present at a predetermined position in said housing.

14. An apparatus as claimed in claim 11 further comprising:
 control means, coupled to said noise canceling means, for controlling said noise cancelling means so that said noise cancelling means selectively outputs one or a plurality of said acoustic waves to a corresponding one or a plurality of said areas.

15. An apparatus as claimed in claim 11, wherein said noise canceling means comprises:
 filter means, coupled to said noise detecting means, for filtering a first signal corresponding to said noise detected by said noise detecting means and for outputting a second signal;
 a plurality of output units coupled to said filter means, each of said output units corresponding to one of said areas, each of said output units outputting one of said acoustic waves to a corresponding one of said areas in accordance with the second signal supplied from said filter means;
 control means for selectively activating one or a plurality of said output units;
 supplying means for supplying a filter coefficient to said filter means, said filter coefficient corresponding to said one or a plurality of said output units selected by said selecting means.

16. An apparatus as claimed in claim 15, wherein said supplying means has memory means for storing filter coefficients, and selecting means for selecting one of said filter coefficients stored in said memory means, said filter coefficient selected by said selected means being supplied to said selected one or a plurality of said output units.

17. An apparatus as claimed in claim 16, wherein said filter coefficients stored in said memory means have been previously determined based on noises detected in said areas when said mechanism is driven.

18. An apparatus as claimed in claim 16 further comprising:

microphones for detecting noises in respective said areas when said mechanism is driven; and determination means, coupled to each of said microphones, for determining the filter coefficients used in a process of said filter means based on the noise detected by each of said microphones, wherein said microphones and said determination means are periodically activated so that the filter coefficients stored in said memory means are updated.

19. An apparatus as claimed in claim 18, wherein said determination means has an adaptive signal processing circuit for processing, in accordance with a predetermined algorithm, signals corresponding to the noises detected by respective said microphones.

20. An apparatus as claimed in claim 15, wherein each of said output units has a loudspeaker for outputting the acoustic wave.

21. An apparatus as claimed in claim 11, wherein said image forming apparatus is a copy machine.

22. An apparatus as claimed in claim 11, wherein said areas are adjacent to said housing.

23. An apparatus as claimed in claim 11, further comprising:

a peripheral equipment connected to said housing and operatively connected to said mechanism, said peripheral equipment capable of being driven in accordance with an operating instruction input from said operation panel by an operator; and wherein said noise canceling means has first means for outputting a first acoustic wave to a first area adjacent to said operation panel so that said first acoustic wave and a noise present in said first area cancel out, and second means for outputting a second acoustic wave to a area adjacent to said peripheral equipment so that said second acoustic wave and a noise in said second area cancel out.

24. An apparatus as claimed in claim 23 further comprising:

control means for selectively activating one or both of said first and second means of said noise canceling means.

25. An apparatus as claimed in claim 24, wherein said control means selects one or both of said first and second means of said noise means in accordance with the operating instructions input from said operation panel by the operator.

26. An apparatus as claimed in claim 11, wherein said areas are remote from said housing.

27. An apparatus as claimed in claim 26, wherein each of said output units has a loudspeaker for outputting one of said acoustic wave to a corresponding one of said areas, and wherein said loudspeaker is mounted in a partition wall set up at a position remote from said housing.

28. An apparatus as claimed in claim 26, wherein each of said output units has a loudspeaker for outputting one of said acoustic waves to a corresponding one of said areas, and wherein said loudspeaker is provided close to a desk set up in a position remote from said housing.

29. An image forming apparatus comprising:

a housing;

a mechanism, mounted in said housing, for forming images on a medium;

an operation panel formed on said housing, said mechanism being driven in accordance with an operating instruction input from said operation panel by an operator;

noise detecting means, provided in said housing, for detecting a noise generated by a driving of said mechanism; and noise canceling means, coupled to said noise detecting means, for outputting an acoustic wave to an area remote from said housing, said acoustic wave being generated based on the noise detected by said detecting means so that said acoustic wave and a noise present in said area cancel out, whereby the noise present in said area is reduced.

30. An apparatus as claimed in claim 29, wherein said noise detecting means includes a detector for detecting a vibration of a driving source in said mechanism.

31. An apparatus as claimed in claim 29, wherein said noise detecting means includes a microphone for detecting a noise at a predetermined position in said housing.

32. An apparatus as claimed in claim 29, wherein said noise canceling means comprises:

filter means for filtering a first signal corresponding to the noise detected by said noise detecting means and for outputting a second signal corresponding to said acoustic wave; and outputting means for outputting said acoustic wave in accordance with the second signal supplied from said filter means.

33. An apparatus as claimed in claim 32, further comprising:

memory means for storing a filter coefficient used in a process of said filter means.

34. An apparatus as claimed in claim 33, wherein the filter coefficient stored in said memory means has been previously determined based on a noise detected in said area when said mechanism is driven.

35. An apparatus as claimed in claim 33 further comprising:

a microphone for detecting a noise in said area when said mechanism is driven; and determination means, coupled to said microphone, for determining the filter coefficient used in a process of said filter means based on the noise detected by said microphone, wherein said microphone and said determination means are periodically activated so that the filter coefficient stored in said memory means is updated.

36. An apparatus as claimed in claim 35, wherein said determination means has an adaptive signal processing circuit for processing, in accordance with a predetermined algorithm, a signal corresponding to the noise detected by said microphone.

37. An apparatus as claimed in claim 32, wherein said outputting means has a loudspeaker for outputting the acoustic wave.

38. An apparatus as claimed in claim 29, wherein said image forming apparatus is a copy machine.

* * * * *

UNITED STATES PATENT AND TRADEMARK OFFICE
CERTIFICATE OF CORRECTION

PATENT NO. : 5,289,147

DATED : February 22, 1994

INVENTOR(S) : Koike, et al.

It is certified that error appears in the above-identified patent and that said Letters Patent is hereby corrected as shown below:

On the title page: Item [75]

"Tkaaki" should be --Takaaki--.

Signed and Sealed this

Thirty-first Day of January, 1995

Attest:

BRUCE LEHMAN

Attesting Officer

Commissioner of Patents and Trademarks